(12) United States Patent
Dworkin (10) Patent No.: US 7,139,724 B1
(45) Date of Patent: Nov. 21, 2006

(54) INTERNET PROMOTION REDEMPTION

(76) Inventor: Barry Dworkin, 6222 E. Tamarind St., Oak Park, CA (US) 91377

( * ) Notice: Subject to any disclaimer, the term of this patent is extended or adjusted under 35 U.S.C. 154(b) by 1285 days.

(21) Appl. No.: 09/589,266

(22) Filed: Jun. 7, 2000

(51) Int. Cl.
G06Q 30/00 (2006.01)
(52) U.S. Cl. .................................................. 705/14
(58) Field of Classification Search ................ 705/14
See application file for complete search history.

(56) References Cited

U.S. PATENT DOCUMENTS 5,864,604 A * 1/1999 Moen et al. ............ 379/114.2

2001/0001854 A1 * 5/2001 Schena et al. ................ 705/27

OTHER PUBLICATIONS

Definition of "comprise", Merriam-Webster's Collegiate Dictionary accessed at http://www.search.eb.com/, May 29, 2003.*
"Cable & Wireless intros peel & stick prepaid cards", Newsbytes News Network, Nov. 3, 1999.*

* cited by examiner

*Primary Examiner*—Donald L. Champagne
(74) *Attorney, Agent, or Firm*—Kelly Lowry & Kelley, LLP (57) ABSTRACT

Internet promotion redemption (10) for business cards (112), coupons (212), greeting cards (312) and phone books enabling a user to enter in a identification code which is specific to a vendor displaying promotion vendor name and promotion vendor discount.

5 Claims, 6 Drawing Sheets

The Best Gift I Could Find For My Computer Guy!

INTERNET PROMOTION REDEMPTION

BACKGROUND OF THE INVENTION

1. Field of the Invention

The present invention relates to Internet promotion redemption for business cards. More particularly, the present invention relates to Internet promotion redemption for business cards, coupons, greeting cards and phone books enabling a user to enter in a identification code which is specific to a vendor displaying promotion vendor name and promotion vendor discount.

2. Description of the Prior Art

Numerous innovations for Internet promotion redemption have been provided in the prior art that are described as follows. Even though these innovations may be suitable for the specific individual purposes to which they address, they differ from the present invention as hereinafter contrasted.

In U.S. Pat. No. 6,014,651, titled, Commercial online software distribution systems and methods using encryption for security, invented by Crawford. A customer computer connects to an online service provider by phone, Internet, or other telecommunications link. The link gives the customer access to additional processing and storage resources such as virtual storage, processing power and/or additional software or data through interaction between the customer computer and an online service provider computer over the link. The additional resources made available to the customer computer enhance the customers' local needs through access to virtual storage, a more powerful processor of similar type for program execution, and/or online support services such as software rental, software sales, release update services, anti-viral services, data backup and recovery services, diagnostic services and/or repair services.

In U.S. Pat. No. 5,996,070, titled, Microprocessor capable of executing condition execution instructions using encoded condition execution field in the instructions, invented by Yamada, et. al. 3-bit condition execution field in an condition execution instruction stores an encoded value obtained by encoding a condition stored in an general purpose flag indicating to execute the condition execution instruction. A microprocessor has an instruction decode unit 2 comprising a condition execution decode section 401 for decoding a value in the condition execution field and a condition execution judgement section 402 for judging whether or not the decoded result from the condition execution decode section 401 is equal to a condition stored in general purpose flags, and outputting the indication to execute the condition execution instruction when both are equal.

In U.S. Pat. No. 5,890,137, titled, On-line shopping system and the method of payment settlement, invented by Koreeda. When performing on-line shopping using the Internet, and when performing payment settlement for a product by a credit card, user's card data runs over the Internet, leaving the possibility of card data leakage, thereby causing a security problem. The user decides the product he or she wants to buy via a computer network (Internet) from a user system. Then, a transmission unit calls up a service center to send order data including the credit card data via a settlement network. Service center invoices the sales price to an approval center based on the order data. Approval center pays the price to service center. Then, service center sends the order data to the shopping system. A delivery processing unit then delivers the product to the user based on the order data.

In U.S. Pat. No. 5,878,141, titled, Computerized purchasing system and method for mediating purchase transactions over an interactive network, invented by Daly, et. al. A computerized, electronic purchase mediating system includes a purchaser database having a list of purchasers and a merchant database having a list of merchants. The purchaser database stores information about each purchaser including a set of personal payment methods that the purchaser could use to purchase goods and/or services. Similarly, the merchant database stores information about each merchant including a set of accepted payment methods that the merchant would accept for sale of the goods and/or services. The purchase system also includes a processor coupled to the purchaser and merchant databases. The processor receives a purchase request and accesses the merchant database according to a merchant identified in the purchase request to retrieve the set of accepted payment methods which corresponds to that merchant. The processor also accesses the purchaser database to retrieve the set of personal payment methods which corresponds to the identified purchaser. The processor then computes an intersection of these two sets to derive a common set of any available payment method that is both accepted by the merchant and can be used by the purchaser for purchase of the goods and/or services. The purchaser is presented with the purchase amount and the common set of available payment methods to choose a most preferred form of payment. Upon selection, the processor consummates the sale and signs a digital signature with the purchaser's permission via password verification to ensure for the merchant that a completed transaction has occurred.

The aforementioned patents differ from the present invention because the patented inventions lack the following features: Group companies doing business on the Internet; Promote discounts, and/or gifts for orders placed through web sites involved; Identification code on business cards, greeting cards, coupon books; Group companies not doing business on the Internet through the use of an identification code on business cards. However, upon review of a patent examiner, he/she may cite a combination of references which may prevent you from obtaining a patent.

Numerous innovations for Internet promotion redemption have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to Internet promotion redemption for business cards. More particularly, the present invention relates to Internet promotion redemption for business cards, coupons, greeting cards and phone books enabling a user to enter in a identification code which is specific to a vendor displaying promotion vendor name and promotion vendor discount.

The types of problems encountered in the prior art are Internet web sites require cost effective marketing to become successful.

In the prior art, unsuccessful attempts to solve this problem were attempted namely: coupons delivered by E-mail. However, the problem was solved by the present invention because the business card is interactive having an Internet component.

Innovations within the prior art are rapidly being exploited in the filed of website promotion.

The present invention went contrary to the teaching of the art which describes and claims coupon redemption methods.

It is a vehicle to bring customers to the internet through multiple company promotion rather than promoting to customers once they are on the internet or by individual companies to promote their web site to attract customers not yet on the web.

The present invention solved a long felt need for a cost effective direct marketing approach to website promotion.

The present invention produced unexpected results namely: repeat business from the original visitors and buyers was increased.

Accordingly, it is an object of the present invention to provide an Internet promotion redemption having a business card, coupon, or greeting card.

More particularly, it is an object of the present invention to provide the business card having business card indicia, business card identification code, and business card promotion.

In keeping with these objects, and with others which will become apparent hereinafter, one feature of the present invention resides, briefly stated, in the business card promotion having business card promotion vendor name, business card promotion vendor website, and business card promotion vendor discount.

When the coupon is designed in accordance with the present invention, it has coupon indicia, coupon identification code, and coupon promotion.

In accordance with another feature of the present invention, the coupon promotion has coupon promotion vendor name, coupon promotion vendor website, and coupon promotion vendor discount.

Another feature of the present invention is that the greeting card has greeting card indicia, greeting card identification code, and greeting card promotion.

Yet another feature of the present invention is that the greeting card promotion has greeting card promotion vendor name, greeting card promotion vendor web site, and greeting card promotion vendor discount.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—Internet promotion redemption (10)

First Embodiment
112—business card (112)
112A—business card indicia (112A)
112B—business card identification code (112B)
112C—business card promotion (112C)
112CA—business card promotion vendor name (112CA)
112CB—business card promotion vendor website (112CB)
112CC—business card promotion vendor discount (112CC)

Second Embodiment
212—coupon (212)
212A—coupon indicia (212A)
212B—coupon identification code (212B)
212C—coupon promotion (212C)
212CA—coupon promotion vendor name (212CA)
212CB—coupon promotion vendor website (212CB)
212CC—coupon promotion vendor discount (212CC)

Third Embodiment
312—greeting card (312)
312A—greeting card indicia (312A)
312B—greeting card identification code (312B)
312C—greeting card promotion (312C)
312CA—greeting card promotion vendor name (312CA)
312CB—greeting card promotion vendor website (312CB)
312CC—greeting card promotion vendor discount (312CC)

First Internet E-Commerce Software
410—first Internet E-commerce software (410)
412—entering (412) the business card identification code (112B) by a user
414—queering (414) the business card identification code (112B) against the business card identification code table
416—matching (416) the business card identification code (112B) with the business card promotion vendor name (112CA) and the business card promotion vendor website (112CB), and the business card promotion vendor discount (112CC)
418—displaying (418) the business card promotion (112C) and the business card promotion vendor discount (112CC) to the user
420—redeeming (420) the business card promotion (112C) by the user entering personal information selected from a group consisting of name, ship to address, ship from address, ship to telephone number, ship to facsimile number, ship from telephone number, ship from facsimile number, ship to E-Mail, ship from E-Mail, payment information, credit card number, credit card expiration date, credit card mailing address, name on credit card Second Internet E-Commerce Software
510—second Internet E-commerce software (510)
512—entering (512) the coupon identification code (212B) by a user
514—queering (514) the coupon identification code (212B) against the coupon identification code table
516—matching (516) the coupon identification code (212B) with the coupon promotion vendor name (212CA) and the coupon promotion vendor web site (212CB), and the coupon promotion vendor discount (212CC)
518—displaying (518) the coupon promotion (212C) and the coupon promotion vendor discount (212CC) to the user
510—redeeming (520) the coupon promotion (212C) by the user entering personal information selected from a group consisting of name, ship to address, ship from address, ship to telephone number, ship to facsimile number, ship from telephone number, ship from facsimile number, ship to E-Mail, ship from E-Mail, payment information, credit card number, credit card expiration date, credit card mailing address, name on credit card Third Internet E-Commerce Software
610—third Internet E-commerce software (610)
612—entering (612) the greeting card identification code (312B) by a user
614—queering (614) the greeting card identification code (312B) against the greeting card identification code table
616—matching (616) the greeting card identification code (312B) with the greeting card promotion vendor name (312CA) and the greeting card promotion vendor website (312CB), and the greeting card promotion vendor discount (312CC)
618—displaying (618) the greeting card promotion (312C) and the greeting card promotion vendor discount (312CC) to the user 620—redeeming (620) the greeting card promotion (312C) by the user entering personal information selected from a group consisting of name, ship to address, ship from address, ship to telephone number, ship to facsimile number, ship from telephone number, ship from facsimile number, ship to E-Mail, ship from E-Mail, payment information, credit card number, credit card expiration date, credit card mailing address, name on credit card

DESCRIPTION OF THE PREFERRED EMBODIMENT

Figure 1:
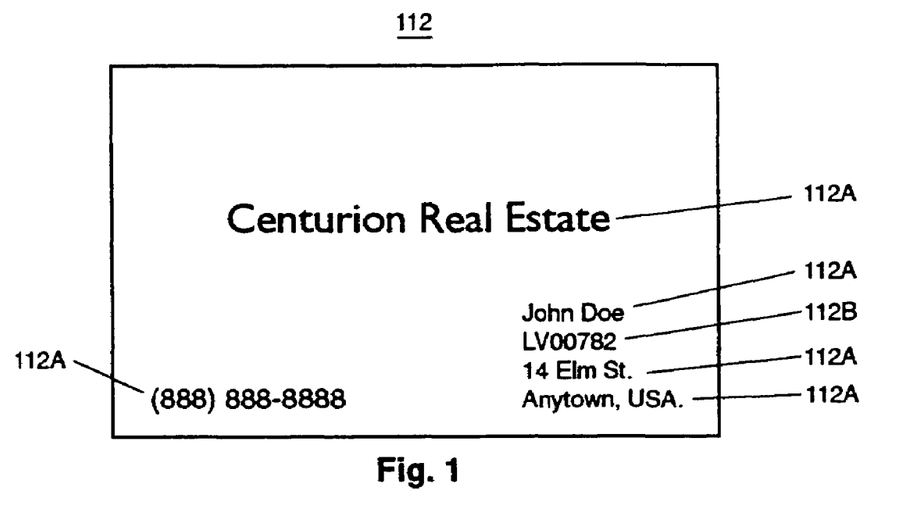
FIG. 1 is a front view of a business card.
Figure 2:
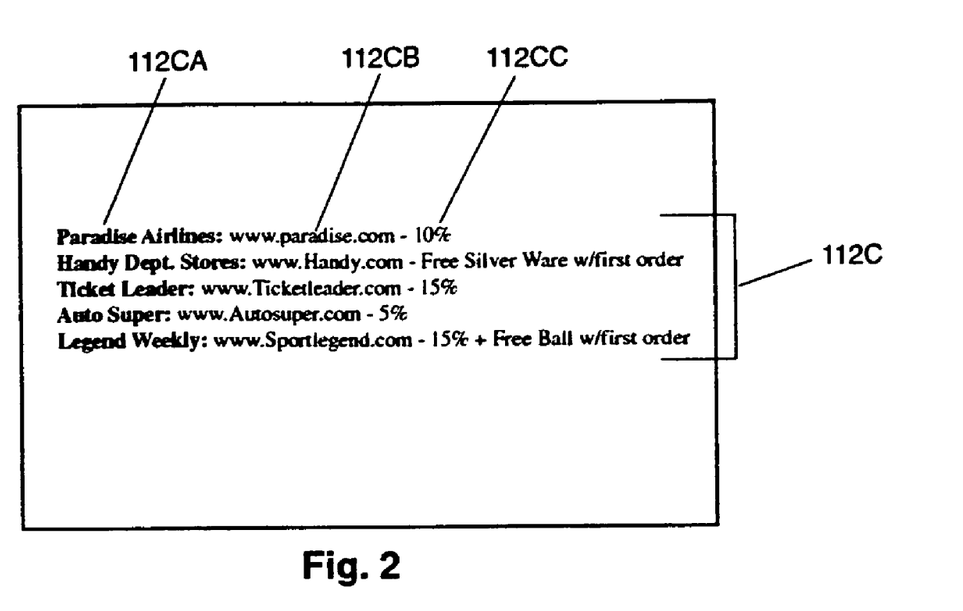
FIG. 2 is a back view of a business card.

Referring to FIG. 1 and FIG. 2 which are a front and rear view of a business card (112), respectively. The Internet promotion redemption (10) comprises an Internet server computer having an operating system and an Internet connection means, and a CPU and a motherboard. The Internet server computer further comprises:
- A) a data storage having the following tables:
  - I) a business card identification code table,
  - II) a business card promotion table,
  - III) a business card promotion vendor name,
  - IV) a business card promotion vendor website, and
  - V) a business card promotion vendor discount;
- B) a business card (112) having a business card indicia (112A) selected from a group consisting of business name, business address, business telephone number, business facsimile number, business E-mail, personal name, personal title, and personal E-mail, business card identification code (112B), business card promotion (112C) having business card promotion vendor name (112CA) and business card promotion vendor website (112CB) and business card promotion vendor discount (112CC);
- C) first Internet E-commerce software (410) comprising the following steps:
  - I) entering (412) the business card identification code (112B) by a user,
  - II) queering (414) the business card identification code (112B) against the business card identification code table,
  - III) matching (416) the business card identification code (112B) with the business card promotion vendor name (112CA) and the business card promotion vendor website (112CB), and the business card promotion vendor discount (112CC),
  - IV) displaying (418) the business card promotion (112C) and the business card promotion vendor discount (112CC) to the user,
  - V) redeeming (420) the business card promotion (112C) by the user entering personal information selected from a group consisting of name, ship to address, ship from address, ship to telephone number, ship to facsimile number, ship from telephone number, ship from facsimile number, ship to E-Mail, ship from E-Mail, payment information, credit card number, credit card expiration date, credit card mailing address, name on credit card.

The user is able to simply redeem the business card promotion (112C) by entering the business card identification code (112B) and entering personal information on the Internet and the entire vendor website dynamically changes to reveal the vendor promotion (price, discount etc.).

Figure 3:
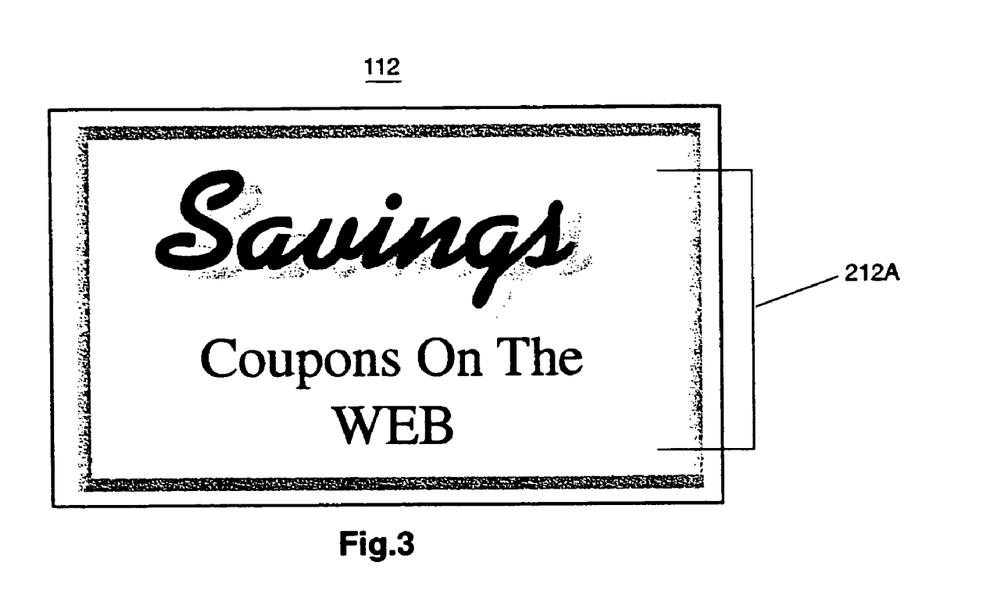
FIG. 3 is a front view of a coupon.
Figure 4:
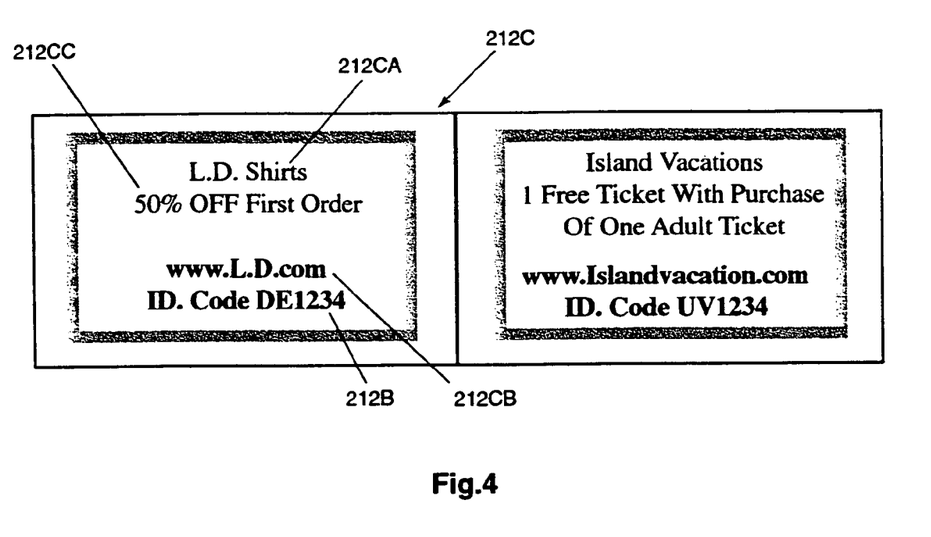
FIG. 4 is a back view of a coupon.

Referring to FIG. 3 and FIG. 4 which are a front and rear view of a coupon (212), respectively. The Internet promotion redemption (10) comprises an Internet server computer having an operating system and an Internet connection means, and a CPU and a motherboard. The Internet server computer further comprises:
- A) a data storage having the following tables:
  - I) a coupon identification code table,
  - II) a coupon promotion table,
  - III) a coupon promotion vendor name,
  - IV) a coupon promotion vendor website, and
  - V) a coupon promotion vendor discount;
- B) a coupon (212) having a coupon indicia (212A) selected from a group consisting of business name, business address, business telephone number, business facsimile number, business E-mail, personal name, personal title, and personal E-mail, coupon identification code (212B), coupon promotion (212C) having coupon promotion vendor name (212CA) and coupon promotion vendor website (212CB) and coupon promotion vendor discount (212CC);
- C) second Internet E-commerce software (510) comprising the following steps:
  - I) entering (512) the coupon identification code (212B) by a user,
  - II) queering (514) the coupon identification code (212B) against the coupon identification code table,
  - III) matching (516) the coupon identification code (212B) with the coupon promotion vendor name (212CA) and the coupon promotion vendor website (212CB), and the coupon promotion vendor discount (212CC),
  - IV) displaying (518) the coupon promotion (212C) and the coupon promotion vendor discount (212CC) to the user,
  - V) redeeming (520) the coupon promotion (212C) by the user entering personal information selected from a group consisting of name, ship to address, ship from address, ship to telephone number, ship to facsimile number, ship from telephone number, ship from facsimile number, ship to E-Mail, ship from E-Mail, payment information, credit card number, credit card expiration date, credit card mailing address, name on credit card.

The user is able to simply redeem the coupon (212) by entering the coupon identification code (212B) and entering personal information on the Internet and the entire vendor website dynamically changes to reveal the vendor promotion (price, discount etc.).

Figure 5:
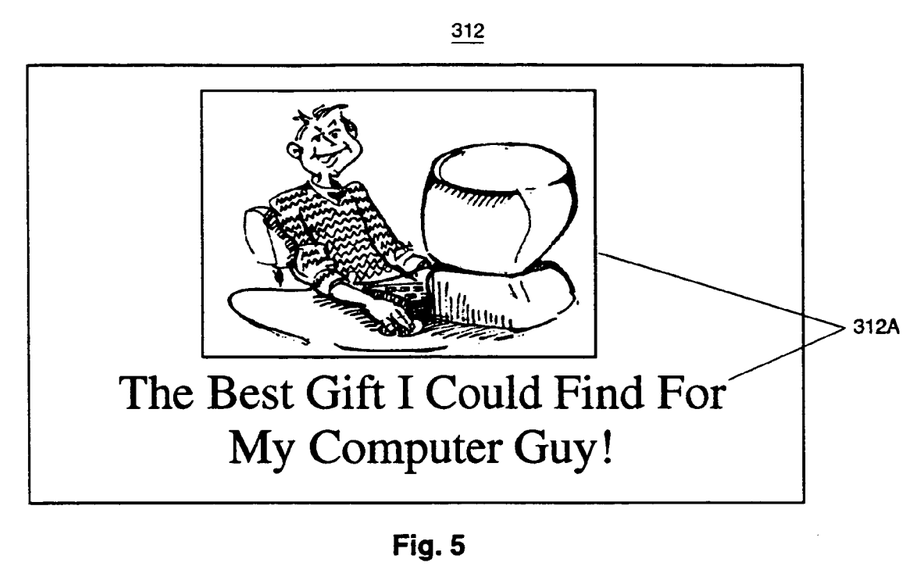
FIG. 5 is a front view of a greeting card.
Figure 6:
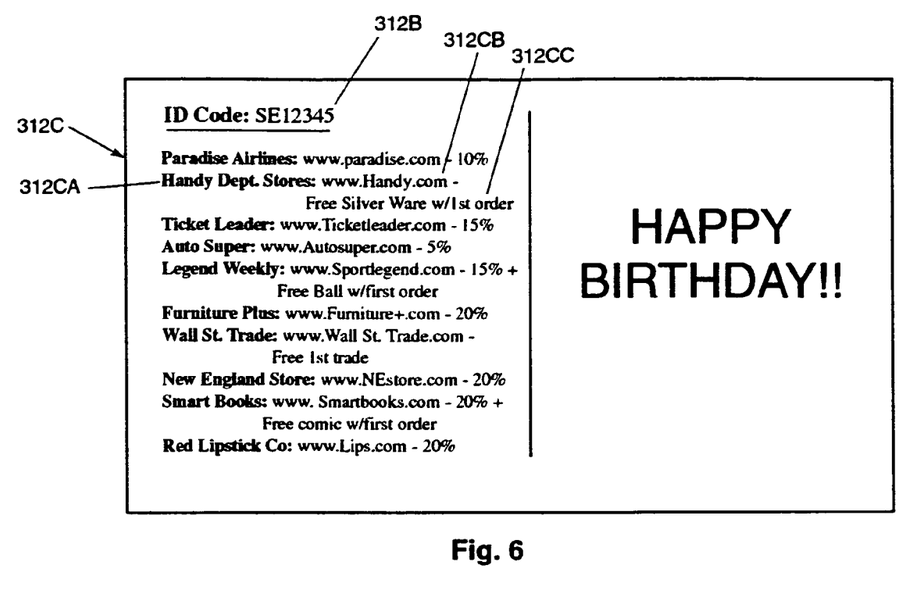
FIG. 6 is a back view of a greeting card.

Referring to FIG. 5 and FIG. 6 which are a front and rear view of a greeting card (312), respectively. The Internet promotion redemption (10) comprises an Internet server computer having an operating system and an Internet connection means, and a CPU and a motherboard. The Internet server computer further comprises:
- A) a data storage having the following tables:
  - I) a greeting card identification code table,
  - II) a greeting card promotion table,
  - III) a greeting card promotion vendor name,
  - IV) a greeting card promotion vendor website, and
  - V) a greeting card promotion vendor discount;

B) a greeting card (312) having a greeting card indicia (312A) (preferably including a salutation) selected from a group consisting of greeting name, greeting address, greeting telephone number, greeting facsimile number, greeting E-mail, personal name, personal title, and personal E-mail, greeting card identification code (312B), greeting card promotion (312C) having greeting card promotion vendor name (312CA) and greeting card promotion vendor website (312CB) and greeting card promotion vendor discount (312CC);

C) third Internet E-commerce software (610) comprising the following steps:
  I) entering (612) the greeting card identification code (312B) by a user,
  II) queering (614) the greeting card identification code (312B) against the greeting card identification code table,
  III) matching (616) the greeting card identification code (312B) with the greeting card promotion vendor name (312CA) and the greeting card promotion vendor website (312CB), and the greeting card promotion vendor discount (312CC),
  IV) displaying (618) the greeting card promotion (312C) and the greeting card promotion vendor discount (312CC) to the user,
  V) redeeming (420) the greeting card promotion (312C) by the user entering personal information selected from a group consisting of name, ship to address, ship from address, ship to telephone number, ship to facsimile number, ship from telephone number, ship from facsimile number, ship to E-Mail, ship from E-Mail, payment information, credit card number, credit card expiration date, credit card mailing address, name on credit card.

The user is able to simply redeem the greeting card promotion (312C) by entering the greeting card identification code (312B) and entering personal information on the Internet and the entire vendor website dynamically changes to reveal the vendor promotion (price, discount etc.).

It will be understood that each of the elements described above, or two or more together, may also find a useful application in other types of constructions differing from the type described above.

While the invention has been illustrated and described as embodied in a Internet promotion redemption, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for encouraging retention of business or greeting cards and simultaneously increasing visits to participating web-sites, the method comprising the steps of:
  providing a paper or plastic-based multi-purpose card in the form of business or a greeting card;
  printing a list of participating vendor web-site addresses and associated promotional discount indicia on the business or greeting card so as to be visually distinguishable by a cardholder;
  printing a promotional code on the business of greeting card so as to be visually distinguishable by a cardholder;
  using a computer network to access a participating vendor web-site using the vendor web-site address printed on the business or greeting card; and
  entering the promotional code on the business or greeting card at the web-site to obtain the promotional discount.

2. The method of claim 1, wherein the business card includes business or individual identifying indicia selected from the group consisting of: business or individual telephone number, business or individual mailing address, business or individual e-mail address, and business or individual name or identifying logo.

3. The multi-purpose card of claim 2, wherein the web-site addresses of the participating vendors are printed on an opposite side of the card as the business or individual identifying indicia.

4. The method of claim 1, wherein the greeting card includes artwork and a message.

5. The method of claim 4, wherein the web-site addresses of the participating vendors are printed on a face of the greeting card not having the artwork or message printed thereon.

* * * * *